United States Patent [19]

Heimala et al.

[11] Patent Number: 5,009,870
[45] Date of Patent: Apr. 23, 1991

[54] METHOD FOR REMOVING SULPHUR AND NITROGEN COMPOUNDS FROM GAS

[75] Inventors: Seppo O. Heimala; Olli V. J. Hyvärinen, both of Pori; Maija-Leena Metsärinta, Ulvila, all of Finland

[73] Assignee: Outokumpu Oy, Helsinki, Finland

[21] Appl. No.: 438,450

[22] PCT Filed: Apr. 26, 1989

[86] PCT No.: PCT/FI89/00077
§ 371 Date: Dec. 12, 1989
§ 102(e) Date: Dec. 12, 1989

[87] PCT Pub. No.: WO89/10181
PCT Pub. Date: Nov. 2, 1989

[51] Int. Cl.$^5$ .................. B01J 8/00; C01B 17/00; C01B 21/00
[52] U.S. Cl. ................... 423/239; 423/242; 423/244

[58] Field of Search ............... 423/244, 239, 239 A, 423/244 R, 242 A, 242 R

[56] References Cited

U.S. PATENT DOCUMENTS 1,701,825  2/1929  Seil .................. 423/244 A
2,031,410  2/1936  Fulweiler .............. 423/239

Primary Examiner—Gregory A. Heller
Attorney, Agent, or Firm—Brooks Haidt Haffner & Delahunty

[57] ABSTRACT

The invention relates to a method for removing sulphur and nitrogen compounds from gases by means of long-chained sulphur compounds mainly in acidic conditions, with an electroconductive solid material serving as the carrier of the long-chained sulphur compounds. The properties of the solid material surface are adjusted to be favourable to the sulphur polymer by means of potential measurements with mineral electrodes.

17 Claims, 1 Drawing Sheet

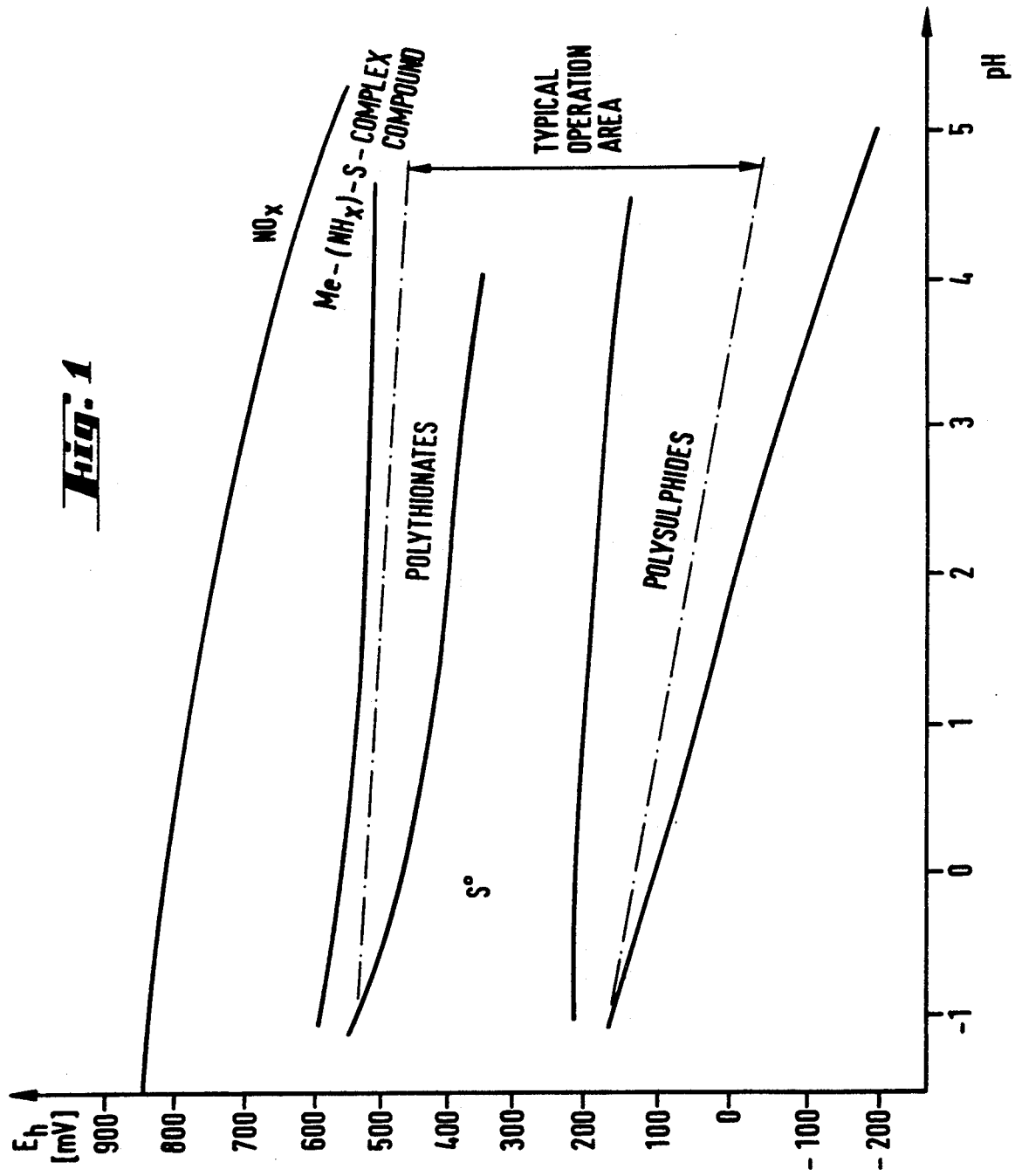

METHOD FOR REMOVING SULPHUR AND NITROGEN COMPOUNDS FROM GAS

The present invention relates to a method for removing sulphur and nitrogen compounds from gas by means of long-chained sulphur compounds, mainly in acidic conditions, while an electroconductive solid agent serves as the carrier of the long-chained sulphur compounds.

Most of the cases where the removal of sulphur and nitrogen compounds from gases is required, are directly or indirectly connected to the production of energy. Consequently the treated gas amounts are fairly large, typically within the range of 200,000–2,000,000 $Nm^3/h$.

At least 200 different processes have been suggested for removing sulphur compounds. In most cases, sulphur compounds: means sulphur dioxide. On the other hand, at least 50 different processes have been suggested for removing nitric oxides from gases. Because so far the rest of the processes have, with respect to the scale, been too complicated and expensive from the point of view of the users, in the removal of sulphur dioxide, methods based on the use of lime have more or less been the only ones that have been put to practice. If the amount of nitric oxides has not been sufficiently reduced by means of arrangements relating to burning (temperature, air coefficient, afterburning etc.), the $NO_x$ gases have been removed by using various catalysts and/or agents sorpting nitric oxides.

The use of lime is the most general example of the use of alkalic agents. Besides high economic costs, a common drawback of these processes using lime, is the continuous creation of large amounts of waste gypsum, $CaSO_4 \cdot x\, H_2O$, which in the long run causes insupportable environmental hazards. The said waste contains, among other things, the heavy metals Cd, Pb, As, Hg etc., which also are gradually dissolved in the environment. It has turned out that the removal of nitric oxides by means of $NH_3$ easily brings about catalytic poisoning, in addition to which the $NO_x/NH_3$ ratio is difficult to adjust in practice, and among other things ammonia sulphate, $(NH_4)_2SO_4$, is created.

Usually exhaust gases contain 1–10% oxygen, and therefore it is as such natural that many removal processes suggest the oxidation of sulphur dioxide into sulphuric acid, and/or the oxidation of nitric oxides into nitric acid. With exhaust gases, these are reactions that happen naturally according to thermodynamics, but in reality a catalyst is needed. One weakness of this method group is related to this said catalyst. Another and larger drawback is, however, related to the quality of the obtained products. Obviously there are cases where even a low-quality sulphuric acid or nitric acid can be used, but in the majority of cases sulphuric acid in particular brings about serious elimination problems. Also with respect to washing efficiency, these reduction methods often cause trouble.

As a third fairly large process group let us mention the methods where the operations are generally carried out within a slightly acidic range, usually within the pH range 3.5–6, either in a buffered or an unbuffered system. There the process is often based on the sorption of sulphur dioxide into the solution in question. The sorption may be wholly or partly connected to the reduction carried out by means of sulphide. Usually the employed sulphide is $H_2S$ or $Na_2S$, sometimes it can be a solid sulphide or for instance FeS, which in the older processes in practice means $Fe_{1-x}S$, which is totally different from FeS. In this process group, the washing efficiency with respect to sulphur dioxide is better than in the processes based on the use of lime. Normally a separate step is used for removing nitric oxides.

As an example from the last group, let us mention the U.S. Pat. No. 4,634,582. In this method sulphur dioxide is removed by using sulphide and buck as reagents. The washing solution is buffered, for instance with citric acid, within the pH range 3.5–5.5. The washing temperature is 38°–66° C. The washing of sulphur dioxide is carried out with hydrogen sulphide and polythionates contained in the solution, which in practice means $S_2O_3$, $S_3O_6$ and $S_4O_6$. The regeneration of the washing solution into elemental sulphur is generally carried out separately by means of sulphide. The washing efficiency of sulphur dioxide in the process is fairly good, but the process is quite complicated and expensive to use.

In the method disclosed in the U.S. Pat. No. 4,629,609, the sulphur dioxide is adsorbed with dry activated carbon in the temperature of 70°–200° C. By means of this process, the amount of sulphur dioxide is essentially reduced, whereafter the nitric oxides are removed according to the prior art, by using ammonia and catalysts. Because the removal of sulphur dioxide is based on a typical adsorption, the process is sensitive to disturbances, among others because the surfaces get dirty. With respect to the amount of carbon consumed, the amount of removed sulphur dioxide is small.

When studying the chemistry of sulphur compounds, it has been observed that in certain conditions long-chained sulphur compounds, which contain 3–20 sulphur atoms per molecule, can be made sufficiently constant within a fairly large range even in surprising conditions, among others in solutions with a low pH value, although the presence of for instance polysulphides is, according to the equilibriums, limited to a very small area in the vicinity of pH 8.5. It turned out that the same was true with long-chained so-called polythionates, where one molecule contains 3–20 sulphur atoms. When employed in a suitable fashion, these long-chained sulphur compounds have proved to be very efficient removers of sulphur and nitrogen compounds. As the carriers of these long-chained sulphur compounds there are employed suitable electroconductive solids, for instance in slurry form.

The achieved washing rates have been multiplied, even by many tenfolds, as compared to the previously known methods. It is a surprising fact that sulphur dioxide, hydrogen sulphide and nitric oxides can all be efficiently removed even in one step. The final products are elemental sulphur, elemental nitrogen and/or ammonia.

For the washing of gases, the method advantageously uses slurries, but the same process can be applied, in a less effective form, to the use of solutions as well. While using slurries, the high reaction rates enable the washing to be carried out for instance in a device of the venturi type.

While using slurries, the employed solid is an electroconductive material, such as a metal phase, for instance a copper, nickel, cobalt or iron sulphide phase, a phosphide, carbide or nitride phase, a carbonaceous material or a material that has been made such on the surface. It is obvious that a large number of materials fulfil the condition of electroconductivity. The best among these have proved to be materials which are not very hydrophilic on the surface, or can be made hydrophobic by employing the method of the U.S. Pat. No. 4,917,775. It has turned out that on such surfaces the constancy of sulphur polymers can be made sufficiently good by applying in the adjusting process the aforementioned method or a method further developed therefrom.

When part of the surface of the solid material is covered by reducing sulphur polymers, or is in contact with them, it is been observed that the removal of sulphur dioxide in the washing takes place surprisingly quickly, even in acidic solutions. It has also been discovered that nitric oxides remove from gases in these polymer slurries. With nitric oxides, however, it has turned out to be advantageous to add into the washing slurries or solutions some catalysts that increase the reaction rates of the polymers, for instance valuable metals in small amounts or particularly transition metals, such as nickel and/or cobalt. Certain long-chained organic substances, such as hydrocarbons containing nitric groups, have also been proved to be effective catalysts in the removal of $NO_x$ and $SO_2$.

If we are talking about a sulphide, or a solid that in the solution may turn into sulphide, it is important to adjust the conditions on the solid surface to be favourable to sulphur polymers by means of potential measuring carried out with mineral electrodes, because the washing of the gases clear of sulphur and nitrogen compounds does not succeed when using other adjusting methods, such as pH measuring or such potential measuring where a Pt electrode or some other inert electrode is employed.

FIG. 1 illustrates the principle according to which elemental sulphur and elemental nitrogen are produced in the washing of gases. By changing the point of adjustment, the recovered products can also be sulphuric acid and for instance nitric acid.

It was said above that the generally applied methods are mainly used with the alkalic range. The method of the present invention is typically operated within the range of pH 0-4. It is true that values higher than this can also be used, but then the formation of sulphate, among others, is increased, and the washing efficiency is cut down. Similarly, the use of solutions with lower pH values is possible according to the method.

The employed reducing sulphur polymers can be such sulphur polymers that are open at the end, and also polysulphides and polythionates. In the reduction-oxidation reactions of mainly interrepellent compounds, usually anionic in type, that are connected to the washing process, the exchange of electrons is carried out by intermediation of the electroconductive solid particles that are contained in the slurry. Simultaneously the said particles slow down the decomposition of long-chained polysulphides and polythionates, as well as the changing of elemental sulphur into a ring form with a weak reactive potential, containing 7-12 atoms. By nature the reactions of sulphur compounds are breaking-up and chaining reactions between polymers, based on oxidations and reductions. These reactions are difficult to study in detail.

It has turned out that even more complicated than the reactions of sulphur compounds are the reactions of nitric compounds, mainly those between $NO_x$ and the above mentioned sulphuric polymers, were compounds of the $Me^{n+}$—(NH)—$S_nSO_k{}^{m-}$ and/or of the polysulphide type play an important role. Irrespective of exact, detailed reaction routes it is important, that by following this simple procedure we achieve a simple and effective washing method for removing both sulphur and nitrogen compounds, a method where an oxygen content posterior to the burning of gases is not a highly disturbing factor.

FIG. 1 illustrates the pH range of elemental sulphur, polysulphides and polythionates along with the changes in the potential. From the economical point of view, the best operation areas are the two border areas (polysulphide and polythionate areas) of the constancy range of kinetically determined elemental sulphur, $S^o$, because there the gas washing is most effective, and the formation of sulphate, owing to oxygen etc., is lowest. The decision which border area should be used depends on the local circumstances, among others the washing temperature, oxygen content, microelements etc. The phases illustrated in the drawing are surface phases.

Because both sulphur dioxide and nitric oxides are oxidizing agents, reduction is needed in the process if elemental sulphur and nitrogen are wanted as the final product. If the desired final products are sulphuric acid and nitric acid, it suffices to carry out the process within the operation range illustrated in FIG. 1.

The final reduction which brings about forming of elemental sulphur and nitrogen is carried out according to which method is most advantageous in each case—either electrolytically by means of electricity, and/or pyrometallurgically by means of, for instance carbon or gas. The advantage gained when operating in acidic solutions is the possibility of using higher temperatures, even above the melting point of sulphur, which is due to the low vapour pressures. The reduction efficiency is generally good. As a result, there is obtained an exhaust gas where the amount of sulphurous gases is within the range of 1-2 ppm, and at the same time the amount of nitric oxides is within the range of 10-20 ppm.

In the experiments that were carried out it was observed that in highly acidic conditions the constancy of the sulphur compounds, located in the surface phase and effective in the washing of gases, tends to weaken to some extent. Therefore it is advantageous to separate the solids containing sulphur polymers prior to the reduction, or to introduce the regenerating reduction products at a slightly higher pH. If the regeneration is carried out electrolytically by reducing the slurry of solid matter and sulphur polymer this pH change will follow automatically. But if the regeneration is carried out by feeding gaseous sulphide into the slurry bed, controlled by either one of the previously mentioned adjusting methods, and straight-chained sulphur and polythionate are used in the operation, the pH effect is not so important.

When the regeneration is carried out wholly or partly in an acidic aqueous solution by means of electrolysis, the decomposition of short-chained, water-soluble polythionates can be carried out by conducting the more acidic side-product anolyte to the solutions obtained from the gas washing and containing $S_2O_3$ etc., in which case there are created elemental sulphur and $SO_4{}^{2-}$. The decomposition of polythionates as such is an undesirable episode leading to the creation of sulphate—because the created sulphate must be regenerated either by means of melt electrolysis, pyrometallurgically or by the aid of bacteria, by adding some organic nutrient.

The most important and most recommendable regeneration in the method is carried out directly to the circulating slurries or solutions without any significant sulphate formation and separation processes connected to it. In a process according to the invention, the formation of sulphate is so slight that it can be bound as a slightly soluble compound ($CaSO_4$, $BaSO_4$, jarosite etc), or the created sulphate can be regenerated in a centralized fashion as a reduction operation common to several gas washing steps (bacteria reduction, electolysis, pyrometallurgical reduction).

It has been found out that electrolytic, continuously operated regeneration, although very complex as for the chemistry of the reduction reactions, is particularly suitable for the removal of $NO_x$ compounds from gases simultaneously with the removal of $SO_2$. This purpose is also enhanced by the presence of the above mentioned solids, binding $NH$, $NH_2$ and other such groups, in the washing slurries and thus also in the regenerated slurries. In connection to electrolytic regeneration, $NO_x$ also renders ammonia or other products containing $NH_x$.

Along with the gas washing, small amounts of lead, cadmium, zinc, quicksilver etc. are recovered in metal sulphides, and these can be separated either in the preliminary washing or from the molten elemental sulphur in order to be treated in suitable processes. If the gas washing is not carried out above the melting point of sulphur and at the same time below the ignition point of sulphur, the separation of sulphur from the solids can be carried out by evaporating or dissolving it to the solvents of sulphur, one of which is $Na_2S$. In that case a typical intermediate product is $Na_2S_{4.5-10}$, which can be processed into elemental sulphur. Other separation methods are evaporation, dissolution with ammonia or with organic nitrogen compounds, such as amines.

The invention is further described with reference to the following examples:

EXAMPLE 1

Waste gases from the burning of carbon, containing 1100–1200 ppm sulphur dioxide and 320–370 ppm nitric oxides, were conducted into a grate composed on the surfaces of $Cu_{1-x}S$, $FeS_{2-x}$ and carbon, into contact with 30–45% sulphuric acid and hydrogen sulphide prepared from elemental sulphur by means of electrolysis. The hydrogen sulphide and other circumstances were controlled by means of copper sulphide and iron pyrite electrodes as far as the border area of $S^o$ and polythionates, seen in FIG. 1, while the temperature was 115°–128° C. After washing, the exhaust gases contained 1–15 ppm sulphur dioxide, less than 1 ppm hydrogen sulphide, and 30–150 ppm nitric oxides, when the volume of the washing tower was 2 volume units and the gas flow respectively 8–20 volume units per second. Molten sulphur was removed from the bottom of the washing tower by bleeding.

The washed gases were conducted into a venturi tube in the temperature of 70°–85° C. together with the polythionate slurry, which contained 50 g/l $(CO,Ni_x)S$, 100 g/l carbon and 75 g/l $S^o$ while the pH was 1–2. For adjusting, the same mineral electrodes were used as in the first stage of the washing.

The adjusting of the first stage was carried out so that the sulphur content of the sulphur polymers varied between 12–20 sulphur atoms per molecule, according to the frequency response analysis and electrophoresis measurements. In the venturi washing, the sulphur content varied respectively between 6 to 9 sulphur atoms per molecule. After the second stage washing, the contents of the washed gases were less than 1 ppm $SO_2+H_2S$ and less than 10 ppm $NO_x$.

The slurry used in the second stage washing was regenerated by conducting it to the catholyte of the electrolysis cell, into contact with the carbon surface and PCR current. The anode reaction was the creation of oxygen. Among the cathode reactions, let us mention among others the creation and formation of polysulphides from sulphur compounds, as well as reduced $NH$, $NH_2$ and $NH_3$ containing nitrogen compounds, among others, as far as they were not recovered as elemental nitrogen in the washing.

EXAMPLE 2

Waste gases containing 850 ppm sulphur dioxide and 420 ppm nitric oxides were washed with a slurry with a pH within the range 3.1–3.7. The slurry contained 25 g/l elemental sulphur, 50 g/l carbon, 10 g/l cobalt sulphide, 5 g/l mixture powder containing chromium nitride, as well as a large amount (over 20 g/l), sulphur polymers containing 10–15 sulphur atoms per molecule (polythionates and a small amount of polysulphides). The washing was carried out in one single stage so that the potential was controlled to be within the polythionate range, in the immediate vicinity of the sulphur phase, by means of measurements with a metal sulphide mineral electrode, and at the same time the chainlength of the sulphur polymers within the above mentioned area was controlled by means of the amount of the regeneration slurry on its way both to the electrolytic reduction and out of there. An increase in the circulation added to the amount of sulphur atoms in the polymer, whereas an increase in the amount of the washing gas shortened the chain.

The analysis was carried out as a frequency response analysis, by calibrating with the aid of electrophoresis measurements. The washing apparatus was a venturi tube. The delay time of the gas in the washing zone varied within the range of 0.1–0.5 s. The contents of the exhaust gases after washing were:

$SO_2+H_2S$, 0.5–0.6 ppm, and
$NO_x$, 5–25 ppm.

The recovery level of elemental sulphur was 75–85%, the rest of the sulphur in the total sulphur content of the waste gases was recovered as sulphate, which is regenerated in a separate process. Over 80% of the nitric oxides were recovered as elemental nitrogen, and less than 20% was recovered as ammonia in the regeneration process.

We claim:

1. A method for removing sulphur and nitrogen compounds from gases, comprising reducing sulphur dioxide, hydrogen sulphide and nitric oxides from gases by contacting the gases with long-chained sulphur compounds selected from the group consisting of polysulphides and polythionates containing 3–20 sulphur atoms per molecule, at a pH within the range of 0–4, while using an electroconductive solid material as a carrier for said long-chained sulphur compounds.

2. The method of claim 1, characterized in that the electroconductive solid material is a metal phase.

3. The method of claim 1, characterized in that the electroconductive solid material is a copper, nickel, cobalt or iron sulphide.

4. The method of claim 1, characterized in that the electroconductive solid material is a phosphide, carbide or nitride.

5. The method of claim 1, characterized in that the electroconductive solid material is a carbonaceous material.

6. The method of claim 1, characterized in that the electroconductive solid material is in the form of slurry.

7. The method of claim 1, characterized in that the properties of the solid material surface are adjusted to be favourable to a sulphur polymer by means of potential measurements carried out with mineral electrodes.

8. The method of claim 1, characterized in that in order to improve the removal of nitric oxides, agents that work as catalysts are added to the slurry.

9. The method of claim 8, characterized in that some precious metal is added to the slurry.

10. The method of claim 8, characterized in that nickel and/or cobalt is added to the slurry.

11. The method of claim 1, characterized in that the long-chained sulphur compounds used in the reduction of the sulphur and nitrogen compounds are regenerated by means of reduction.

12. The method of claim 11, characterized in that at least part of the regeneration is carried out by means of electrolytic reduction.

13. The method of claim 11, characterized in that at least part of the reduction is carried out by means of bacteria.

14. The method of claim 11, characterized in that at least part of the reduction is carried out pyrometallurgically.

15. The method of any of claims 11–14, characterized in that the obtained product is a compound containing elemental sulphur and elemental nitrogen.

16. The method of any of claims 11–14, characterized in that the obtained product is a compound containing elemental sulphur, elemental nitrogen and $NH_x$.

17. The method of claim 1, wherein said contacting is a washing process and the washing process includes organic compounds containing nitrogen groups.

* * * * *